{| |}
United States Patent
Runge et al.

(10) Patent No.: US 8,126,703 B2
(45) Date of Patent: Feb. 28, 2012

(54) METHOD, SPOKEN DIALOG SYSTEM, AND TELECOMMUNICATIONS TERMINAL DEVICE FOR MULTILINGUAL SPEECH OUTPUT

(75) Inventors: Fred Runge, Wuensdorf (DE);
Klaus-Dieter Liedtke, Nienburg (DE);
Detlef Hardt, Hannover (DE); Martin Eckert, Berlin (DE); Wiebke Johannsen, Berlin (DE); Roman Englert, Swisttal (DE)

(73) Assignee: Deutsche Telekom AG, Bonn (DE)

( * ) Notice: Subject to any disclaimer, the term of this patent is extended or adjusted under 35 U.S.C. 154(b) by 334 days.

(21) Appl. No.: 12/374,666

(22) PCT Filed: Jul. 18, 2007

(86) PCT No.: PCT/EP2007/006372
§ 371 (c)(1),
(2), (4) Date: Jul. 7, 2009

(87) PCT Pub. No.: WO2008/009429
PCT Pub. Date: Jan. 24, 2008

(65) Prior Publication Data
US 2010/0017193 A1    Jan. 21, 2010

(30) Foreign Application Priority Data
Jul. 19, 2006  (DE) .......... 10 2006 033 802

(51) Int. Cl.
*G06F 17/20* (2006.01)

(52) U.S. Cl. .................... 704/8; 704/3; 704/9

(58) Field of Classification Search ............ 704/231, 704/257, 270, 251, 275, 270.1, 1–10, 255; 709/220; 455/555; 84/615
See application file for complete search history.

(56) References Cited

U.S. PATENT DOCUMENTS

| | | |
|---|---|---|
| 6,816,468 B1 | 11/2004 | Cruickshank et al. |
| 6,993,360 B2 * | 1/2006 | Plahte et al. .............. 455/555 |
| 7,136,909 B2 * | 11/2006 | Balasuriya .............. 709/220 |
| 7,470,850 B2 * | 12/2008 | Poultney et al. ............ 84/615 |
| 7,869,998 B1 * | 1/2011 | Di Fabbrizio et al. ........ 704/251 |
| 2006/0120307 A1 | 6/2006 | Sahashi |

FOREIGN PATENT DOCUMENTS
EP    0886424    12/1998

OTHER PUBLICATIONS

"Introduction and Overview of W3C Speech Interface Framework", W3C Working Draft Dec. 4, 2000 (http://www.w3.org/TR/2000/WD-voice-intro-20001204/), downloaded Jan. 29, 2009.

Baldion Leonardo et al., "A General Approach to TTS Reading of Mixed-Language Texts", Proc. of 5th ISCA Speech Synthesis Workshop, 2004.

* cited by examiner

*Primary Examiner* — Huyen X. Vo
(74) *Attorney, Agent, or Firm* — Leydig, Voit & Mayer, Ltd.

(57) ABSTRACT

A method for providing multilingual speech output in an automated spoken dialog system includes setting up a connection between a telecommunications terminal device and the spoken dialog system. In response to a connection setup, a multilingual speech output is provided that includes an output of a first speech sequence in a first language and at least one second speech sequence in at least one second language different from the first language. The first speech sequence and the at least one second speech sequence are output, at least in part, simultaneously.

19 Claims, 4 Drawing Sheets

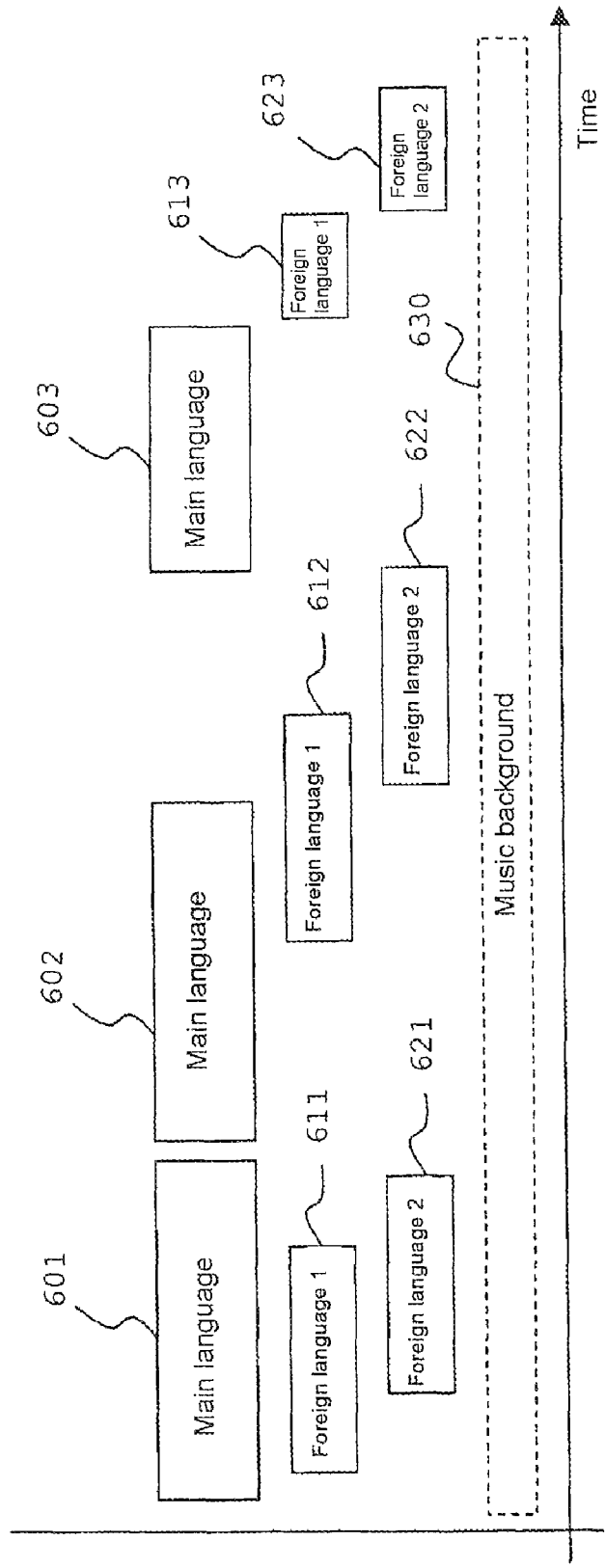

METHOD, SPOKEN DIALOG SYSTEM, AND TELECOMMUNICATIONS TERMINAL DEVICE FOR MULTILINGUAL SPEECH OUTPUT

CLAIM OF PRIORITY

This is a U.S. national phase application under 35 U.S.C. §371 of International Patent Application No. PCT/EP2007/006372, filed Jul. 18, 2007, and claims benefit of German Patent Application No. 10 2006 033 802.2, filed, Jul. 19, 2006. The International Application was published in German on Jan. 24, 2008 as WO/2008/009429 A1 under PCT Article 21(2).

FIELD

The invention concerns spoken dialog systems in general and more particularly a spoken dialog system designed for multilingual speech output, a telecommunications terminal device that can be connected to such a spoken dialog system, and a method for speech output from such a spoken dialog system.

BACKGROUND

The use of spoken dialog systems is customary today in a variety of fields. Thus, for example, spoken dialog systems are used today for controlling access to information databases or for voice control of automated devices, for example, and are also used as access devices for telephone information systems or transaction systems for home banking or teleshopping. Generally speaking, spoken dialog systems can be provided as hardware systems or software systems or a combination of the two.

The general structure of dialog systems used for voice interaction and, analogously, multimodal interaction with at least one user, is known from such sources as "Introduction and Overview of W3C Speech Interface Framework," W3C Working Draft 4 Dec. 2000 (available at the webpage: w3.org/TR/2000/WD-voice-intro-20001204/). The requirements of a multilingual clientele are only partially satisfied by monolingual spoken dialog applications. For this reason, spoken dialog applications are being developed that use language identification technology to determine, on the basis of a caller's first utterance, the language being spoken in order to switch voice outputs and speech recognition grammars to the appropriate language directly following the first utterance to the greatest extent possible. For this to occur, however, the user must be informed that the possibility exists of using the application in a language other than the base language.

A conventional method for letting a user know that a speech application offers the possibility of use in a language other than a main language is to lengthen an introductory speech output prompt to by adding informational statements indicating this possibility.

An originally monolingual speech output prompt in the main language of German, such as "Hallo, hier ist 1 hr Wettervorhersagedienst. Bitte nennen Sie den Ort für die Vorhersage.", for example, can typically be extended to another language by at least one statement. For the example given here, this could be phrased as follows: System: "Hallo, hier ist 1 hr Wettervorhersagedienst. Bitte nennen Sie den Ort für die Vorhersage. If you want to control this service in English, please say English. Bu servisi türk dilinde kullanmak istiyorsaniz, lütfen türkçe söyleyiniz." Or: "Hallo, hier ist Ihr Wettervorhersagedienst. Bitte nennen Sie den Ort für die Vorhersage. Please say the name of the city for the weather forecast."

Such voice outputs can be generated with the aid of recorded speech or also through speech synthesis (Text-To-Speech; TTS). Modern text-to-speech systems have methods for acoustically reproducing in sequence even sequential mixed-language texts while adapting the pronunciation to phonetic particularities of different languages. Such a method is described in "A General Approach to TTS Reading of Mixed-Language Texts" by L. Badino, C. Barolo and S. Quazza, Proc. of $5^{th}$ ISCA Speech Synthesis Workshop, 2004, for example.

In any case, the additional, sequentially occurring output of information in another language, hereinafter also referred to as a secondary language, significantly lengthens the time required for a voice prompt, thus also lengthening the time until the dialog goal is reached, which in general results in significantly lower acceptance by users in the main language, for example German.

SUMMARY

An embodiment of the present invention provides a multilingual speech output in an automated spoken dialog system. The method includes setting up a connection between a telecommunications terminal device and the spoken dialog system; and providing, in response to a connection setup, a multilingual speech output that includes an output of a first speech sequence in a first language and at least one second speech sequence in at least one second language different from the first language. The first speech sequence and the at least one second speech sequence are output, at least in part, simultaneously.

Another embodiment of the invention provides a spoken dialog system configured to provide a multilingual speech output. The spoken dialog system includes a control unit configured to control the spoken dialog system, an input unit configured to register and analyze user inputs, an output unit configured to output at least one speech sequence, and a multilingual speech output unit configured to output a first speech sequence in a first language and at least one second speech sequence in at least one second language different from the first language, wherein the first speech sequence and the at least one second speech sequence are output, at least in part, simultaneously.

Another embodiment of the invention provides a telecommunications terminal device configured to receive in parallel at least two separate speech sequences in different languages. The telecommunications terminal device includes a user interface configured to select, through user inputs, at least one language, and an output device configured to output at least one received speech sequence through a predetermined output channel of the telecommunications terminal device as a function of the selected language.

BRIEF DESCRIPTION OF THE DRAWINGS

The invention is described in detail below with reference to the attached drawings. Identical reference characters in the drawings identify like or identical parts.

FIG. 4 is a schematic representation of a time overlap of speech sequences in different languages.

DETAILED DESCRIPTION

Figure 1:
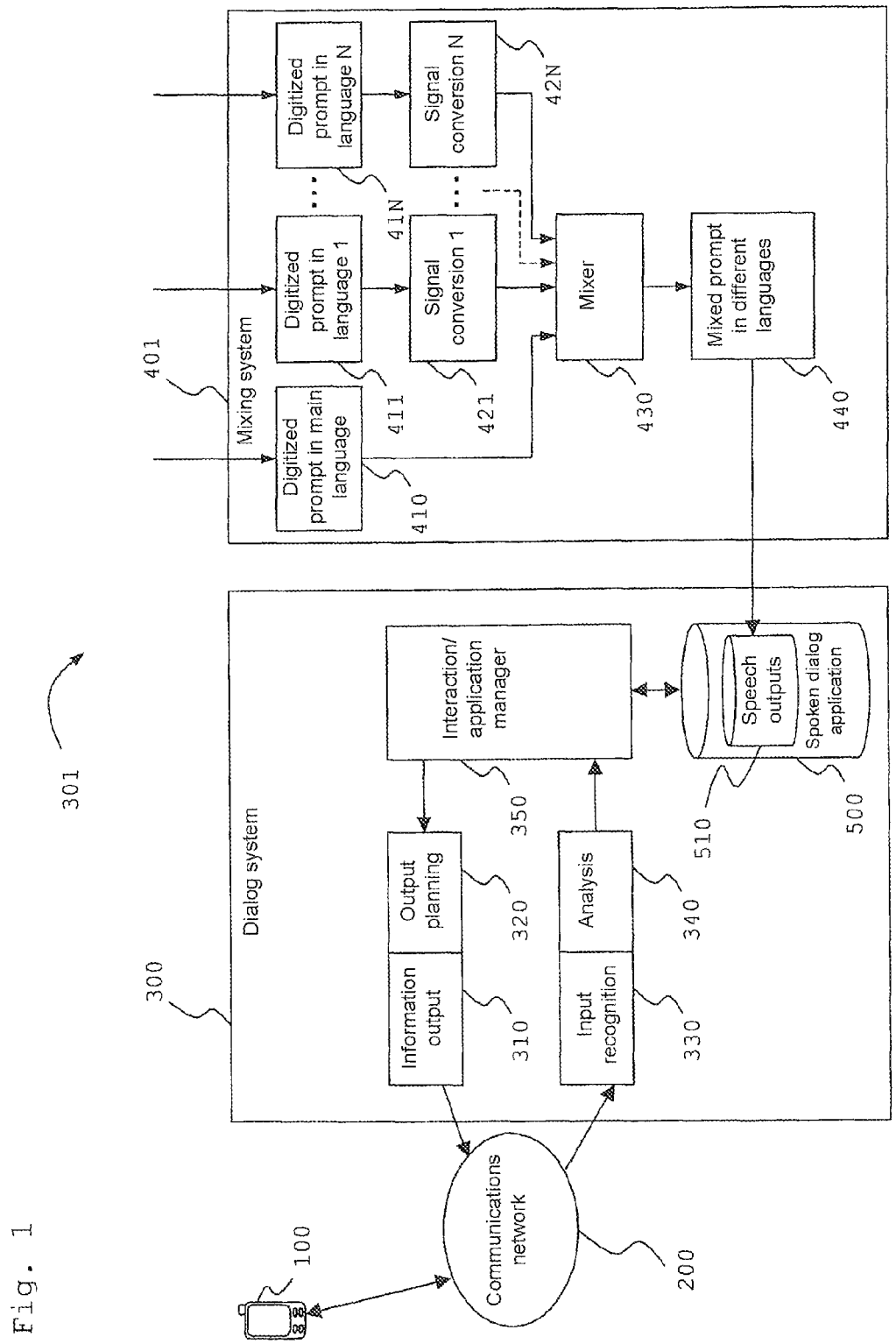
FIG. 1 is a schematic representation of an embodiment of the present invention with a separate mixing system.

Embodiments of the present invention provide an improved way for providing multilingual speech output in an automated spoken dialog system, through which the above mentioned disadvantages, in particular, can be eliminated or at least reduced.

An embodiment of the present invention informs a foreign-language-speaking user of a multilingual spoken dialog system of the possibility of speaking in his native language as early as possible, while at the same time the utilization of a corresponding speech application and the intelligibility in a chosen main language are impaired only very little by additional foreign-language information.

Accordingly, a method embodying the present invention for providing multilingual speech output from an automated spoken dialog system comprises the setup of a connection between a telecommunications terminal device and the spoken dialog system and, in response to connection setup, the provision of a multilingual speech output comprising the output of a first speech sequence in a first language and at least one second speech sequence in at least one second language different from the first language, wherein the first and the at least one second speech sequence are output simultaneously, at least in part.

The speech output is output on the telecommunications terminal device, for example as a speech output prompt. The language of the user of the telecommunications terminal device is than generally recognized as a function of the first utterance of the user and is used as a basis for further speech outputs and also, for example, for speech recognition grammars to be employed.

During development of a multilingual speech application with automatic classification of the language of the user, the question arises as to how the user can be motivated to speak freely in his native language. Since the classification of the spoken language is carried out on the basis of the user's first utterance, the possibility of multilingual use must be indicated to the caller right away with the aid of the welcome prompt. In contrast to multilingual countries such as Switzerland or even Canada, this question plays an important role in Germany, since it is probable that no caller in a German language portal expects to be able to use foreign languages if no indication of this possibility is given. The invention is not so limited, and other countries and languages are with the contemplation of the claimed invention.

Important considerations here are, firstly, that callers using the main or base language such as, e.g., German—who, at approximately 90%, constitute the majority of callers in Germany—are not inconvenienced, and secondly that an indication of the multilinguality—utilization of the system in a secondary language—is given as quickly and as transparently as possible.

A method embodying the present invention advantageously makes it possible to communicate to a foreign-language user of a spoken dialog application that he can also communicate with the application in a language other than the main language, i.e. in a secondary language, without it being necessary to sequentially output explanatory speech outputs in multiple languages and without it being necessary to arrange multiple access addresses and/or numbers, for example telephone numbers, for each language.

Therefore, it is not necessary, for example, to extend the duration of a monolingual speech output prompt by the time needed for each individual additional announcement containing, for example, an additional communication of each possibility for use in a foreign language.

Rather, the method comprises in especially advantageous manner the generation of a multilingual speech output sequence by mixing the first and the at least one second speech sequence.

Furthermore, the first and the at least one second speech sequence preferably differ from one another in at least one signal characteristic, in particular in volume, announcing voice, speaking rate, speech style, intonation, sound effect and/or frequency spectrum.

For this purpose, it is advantageous for at least one signal characteristic of the first and/or at least one second speech sequence to be adjusted prior to mixing.

The inventors have discovered that an effect similar to the so-called "cocktail party effect" can be used for a multilingual speech output. The effect consists in the human capacity to purposefully grasp a specific conversation that has different signal properties from among a babble of different conversations. Similarly, a person can purposefully grasp a communication in his native language from among a babble of simultaneous speech outputs in a foreign language.

The parallel output of voice prompts in a main language and in various secondary languages with supplementary information while utilizing effects similar to the cocktail party effect makes it possible to provide notification of the possibility of using other languages for at least one given spoken dialog application without significant detriment to users in the main language. A significant increase in the duration of the corresponding prompt in the primary language, and an associated decrease in acceptance, can be prevented in this way.

Depending on the embodiment of the invention, generation of the multilingual speech output sequence preferably takes place in the spoken dialog system and/or in the telecommunications terminal device.

In an advantageous embodiment of the method, in order to provide the multilingual speech output, the first and the at least one second speech sequence are transmitted by the spoken dialog system to the telecommunications terminal device, at least one language is selected through user inputs at the telecommunications terminal device, and at least one received speech sequence is output over a predetermined output channel of the telecommunications terminal device as a function of the selected language. The right or left channel of a terminal device designed for stereo output is an example of an appropriate predetermined output channel.

In order to determine whether the telecommunications terminal device which has set up a connection with the spoken dialog system is designed to receive multiple speech sequences simultaneously, to mix speech sequences, and/or to output selected, possibly mixed speech sequences over one of multiple predetermined output channels, an identification is preferably transmitted from the terminal device to the spoken dialog system. The identification itself can advantageously comprise information on the functionalities of the terminal device. Alternatively, the identification specifies the terminal device type, the functionality of which is identified with the aid of an appropriate database; the database, which is accessible to the spoken dialog system, comprises an allocation table for allocating terminal device type and corresponding functionality.

The spoken dialog system advantageously has at least one first and one second operating mode, wherein the operating mode is automatically selected as a function of the identification received from the telecommunications terminal device.

Preferably, in the first operating mode the first and the at least one second speech sequence are mixed into a speech output sequence by means of a mixing system and transmitted to a connected telecommunications terminal device, while in the second operating mode the first and the at least one second speech sequence are transmitted in parallel to a connected telecommunications terminal device.

Typically the spoken dialog system is used for voice control of a service, such as an automatic information service, for example. Accordingly, the method further advantageously comprises the transmission of a user's spoken utterance from the telecommunications terminal device to the spoken dialog system, the identification of a control command through execution of a voice recognition of the received spoken utterance by the spoken dialog system, and the automatic execution of a predetermined action by the spoken dialog system as a function of the identified control command.

A spoken dialog system embodying the present invention can be connected to at least one telecommunications terminal device through a telecommunications network and is designed to carry out multilingual speech output. For this purpose, the spoken dialog system comprises a control unit for controlling the spoken dialog system, an input unit for registering and analyzing user inputs, an output unit for outputting at least one speech sequence, and means to carry out the multilingual speech output comprising the output of a first speech sequence in a first language and at least one second speech sequence in at least one second language different from the first, wherein the first and the at least one second speech sequence are output simultaneously, at least in part. An embodiment of the inventive spoken dialog system can be implemented fully or partially, which is to say in individual modules, on a telecommunications terminal device.

The means for carrying out the multilingual speech output preferably comprise a mixing system for mixing the first and the at least one second speech sequence. In order to vary at least one signal property of the first and/or second speech sequence, the mixing system advantageously comprises suitable means that are preferably designed to adjust volume, announcing voice, speaking rate, speech style, intonation, sound effect, and/or frequency spectrum of a speech sequence.

In an advantageous embodiment of a spoken dialog system, the speech sequences that are to be mixed are delivered to the mixing system as text and are converted by the mixing system into corresponding audio sequences. In this embodiment, the mixing system is preferably designed as a TTS system.

In another advantageous embodiment, in which a mixing of speech sequences can be provided on a terminal device, the means for carrying out the multilingual speech output are means for the parallel transmission of the first and the at least one second speech sequence to a connected telecommunications terminal device.

Accordingly, the spoken dialog system is advantageously designed for a first operating mode, in which the first and the at least one second speech sequence are mixed into a speech output sequence by means of the mixing system and are transmitted to a connected telecommunications terminal device, and is also designed for a second operating mode, in which the first and the at least one second speech sequence are transmitted in parallel to a connected telecommunications terminal device. In this embodiment, the spoken dialog system preferably comprises a memory with an allocation table stored therein, which table is used for allocating terminal device types to the first or second operating mode, wherein the spoken dialog system is designed for automatic activation of the first or second operating mode as a function of an identification received from the terminal device that identifies the terminal device type in question.

A telecommunications terminal device embodying the present invention is designed for parallel reception of at least two separate speech sequences in different languages, and comprises a user interface for selecting at least one language through user inputs and means for outputting at least one received speech sequence through a predetermined output channel of the telecommunications terminal device as a function of the selected language.

The telecommunications terminal device preferably comprises means for mixing speech sequences, wherein said means are advantageously designed to mix at least two speech sequences such that the speech sequences overlap in time, at least partially. In this way, each of at least two time-overlapped speech sequences in different languages can be output through one of the right or left output channels of a telecommunications terminal device designed for stereo output and/or through additional output channels of a telecommunications terminal device designed for multi-channel output (at least stereo output). Alternatively, however, speech sequences in different languages can also be mixed at the terminal device into a speech output sequence in which the individual speech sequences overlap in time, and can be output through the single output channel or through a selected output channel of the terminal device.

Shown schematically in FIG. 1 is a preferred embodiment of a spoken dialog system 301, which serves to execute an automated spoken dialog application when a telecommunications terminal device 100 sets up a connection to the spoken dialog system 301 through an appropriate communications network 200. Depending on the intended use, the terminal device 100 can be designed as a telephone, smart phone, or PDA, for example, and may possibly have a browser for operation by the user. Accordingly, the communications network 200 can be designed as, for example, a telephone network, cell phone network, or as a WAN/LAN, and can support wired or wireless connections.

The embodiment shown in FIG. 1 comprises a dialog system 300, which is supplied with speech outputs 510 by a separate mixing system 401. The mixing system 401 can be provided as an offline mixing system, in particular, and thus need not be connected to the dialog system 300 when the terminal device 100 sets up a connection to the dialog system 300.

The analysis of user inputs takes place in the dialog system 300 by means of a unit for input recognition 330 and a subsequent analysis unit 340. The analyzed user inputs are delivered to an interaction and/or application manager 350. The manager 350 controls the output planning 320 as a function of the user inputs and the spoken dialog application stored in the memory 500. The information output unit 310 following the output planning unit 320 generates the output data that are transmitted over the communications network 200 to the user's terminal device 100.

Appropriate input and output grammars are preferably used for input recognition and information output of the dialog system 300. In this context, a grammar means a structured description of possible inputs for analysis made by a user or by the data processing system itself Examples of possible user inputs are spoken language, text inputs, input through a touchscreen using a stylus, and a user's facial expressions recorded using a camera. Outputs provided by the system include, for example, text character strings in documents, recorded speech, and multimedia files. A grammar represents a form of a media model, and preferably comprises a model for describing the sequence in which inputs, such as words for example, from a media recognizer, such as a speech recognizer for example, are expected and/or in which outputs with specific information content are generated.

A core concept of the invention consists in that, during the greeting in the main language, for example German, a parallel, simultaneously audible invitation to use one or more secondary languages, which is to say foreign languages in relation to German, is played in the applicable foreign language. This invitation is played in the background of the German-language welcome prompt, for example at a volume level that is lower by a few decibels.

A default language of a spoken dialog application, in which the application is preferably used by the target group, is designated as the base or main language. In contrast, an additional language of a spoken dialog application, which is also spoken by a segment of the target group and can be used within the system, is designated as a secondary language. The term "prompt" or "voice prompt" refers to acoustic speech output of information. The term "language" refers in general to a communications system that uses a system of symbols to serve the purpose of communication. In the present document, this term preferably refers to spoken language.

In this context, an effect similar to the so-called "cocktail party effect" is exploited. The effect consists in the human capacity to purposefully grasp a specific conversation that has different signal properties from among a babble of different conversations. Similarly, a person can purposefully grasp a communication in his native language from among a babble of simultaneous speech outputs in a foreign language. When applied to the scenario of the multilingual portal, this means that the reference to utilization of the native language "hidden" in the welcome prompt directly "grabs the attention" of the foreign-language caller, thus motivating him to continue in his own native language. In this connection, the reference in the background can be worded such that it is understood as a direct invitation, for example, "How can I help you?".

The inventors have discovered that, in the presence of mixed, simultaneous output, which is to say not strictly sequential output, of at least two voice prompts in different languages, a person can extract the information content of particular overlapping prompts in the native language or main language that are mixed in while simultaneously ignoring speech outputs in partially unintelligible foreign languages. This monaural effect is similar to the known binaural cocktail party effect, in which localization of the sound source is necessary. However, both effects exploit the ear's ability to filter out interfering sounds, in this case the voice in a foreign, predominantly unknown secondary language, through knowledge of expected signal characteristics and sound combinations.

In the case of a mixture of prompts in different languages, the distinguishability of the mixed prompt announcements in the individual languages is advantageously increased further in that the individual announcements are provided with different signal characteristics. To this end, the announcements are provided with different signal characteristics either in advance, for example during recording, or during playback by means of the technology employed.

In the embodiment shown in FIG. 1, the announcements are provided with different signal characteristics in advance, and are stored in the memory 500 as speech outputs that are ready for retrieval. To this end, a separate offline mixing system 401 is provided; a digitized voice prompt 410 in a main language, such as German for example, and N additional digitized voice prompts 411 to 41N, each in a different secondary language, such as English, Turkish or French, for example, are delivered to said mixing system. In the example embodiment shown, the signal characteristics of the voice prompts 411 to 41N provided in the secondary languages are varied by means of associated modules 421 through 42N for signal conversion, and are mixed together with the voice prompt in the main language by means of the mixer 430 to produce a mixed prompt 440 in different languages. The mixed prompt 440 is stored in the memory 500 for use by the dialog system 300 as a speech output 510.

Figure 2:
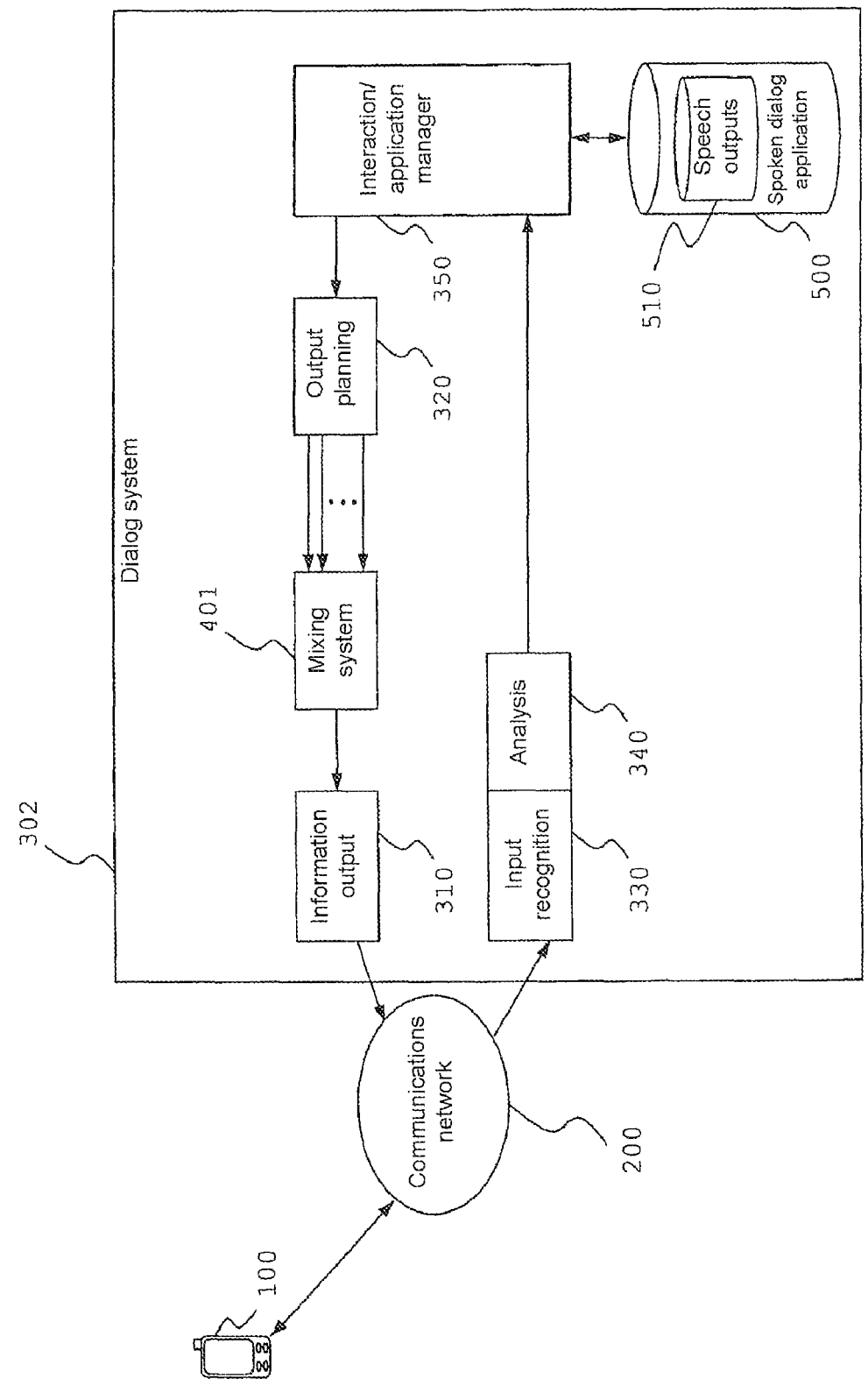
FIG. 2 is a schematic representation of a second embodiment of the present invention with an integrated mixing system.

In the example embodiment shown in FIG. 2, prompt mixing takes place during the playback time, i.e. while the terminal device 100 is connected to the dialog system 302 through the communications network 200. To this end, the mixing system 401 is integrated into the dialog system 302, wherein it is located between the output planning 320 and the information output 310. In this embodiment, the mixing system 401 is preferably supplied with digitized voice prompts 510 in different languages, stored in the memory 500. The structure of the mixing system 401 here corresponds largely to that of the mixing system 401 shown in FIG. 1.

Figure 3:
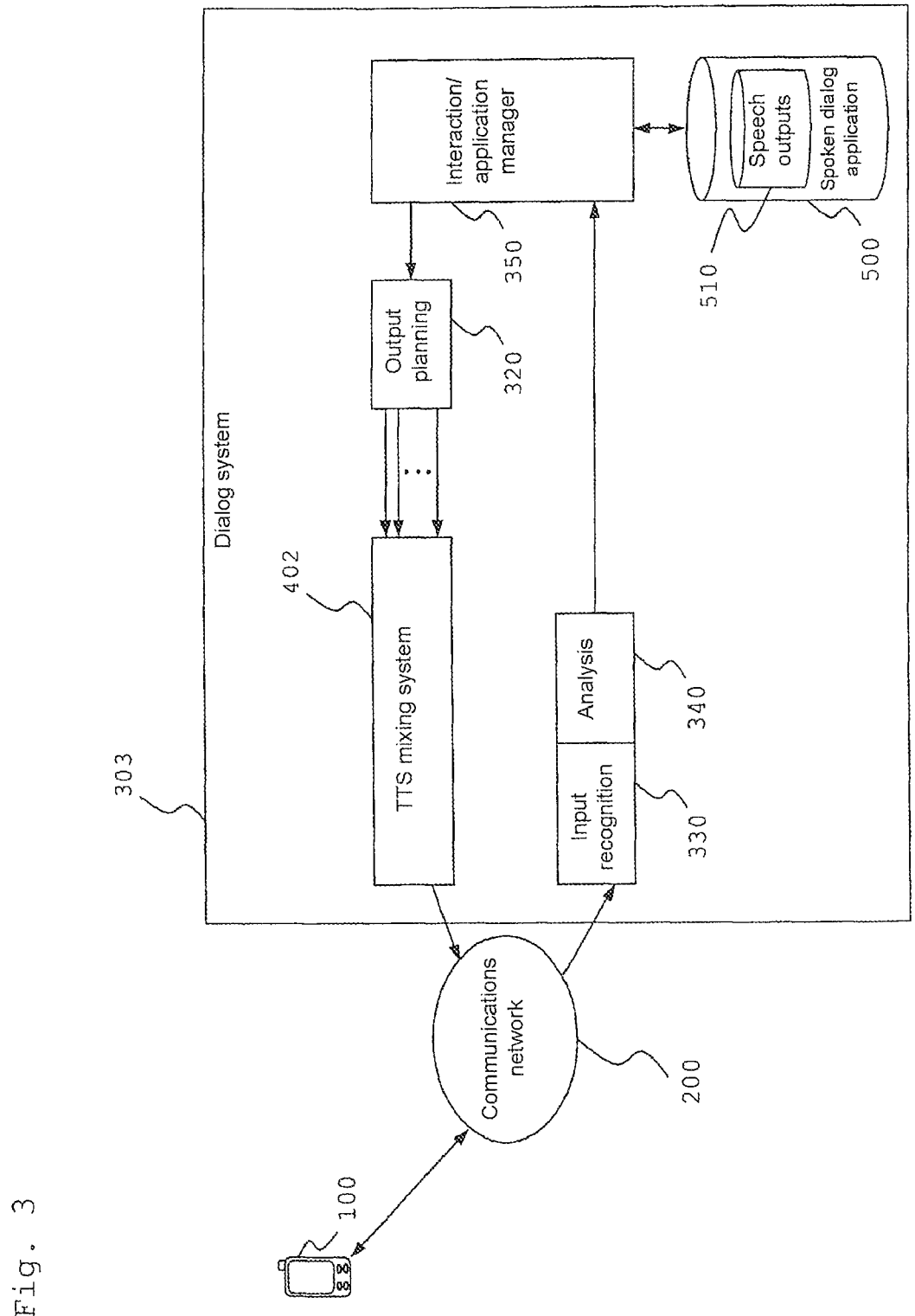
FIG. 3 is a schematic representation of a third embodiment of the invention in which the mixing system is designed as a TTS system.

In the example embodiment shown in FIG. 3, a TTS mixing system 402 is provided that follows the output planning 320. The TTS mixing system 402 is designed to produce a mixed voice prompt from received texts in different languages. The TTS mixing system 402 preferably comprises at least one speech synthesis system that automatically performs the mixing of different input texts, possibly with modification of the signal characteristics of the speech outputs, for the different texts. In the example embodiment shown, the TTS mixing system 402 also takes on the function of information output; thus, no additional output unit 310 such as is shown in FIG. 2 is required. The announcements in different languages, which in this example embodiment are stored in the memory 500 as texts 510, are delivered to the TTS mixing system 402 by the output planning 320 under the control of the application manager 350.

Each of the mixing systems 401 and 402 includes units for signal conversion, by means of which the signal characteristics of the voice prompts in different languages can be adjusted. The signal characteristics of the different voice prompts can be modified as needed, for example through one or more of the following methods or adjustments:

Use of different voices, for example by employing different speakers during the recording of the prompts to be mixed, or using different voices in text-to-speech systems, Different expansion and/or compression of the frequency spectrum of the different announcements to be mixed, Different speaking rates of the different announcements to be mixed, Different selective filtering-out of various spectral regions of the different announcements to be mixed, possibly with different filter characteristics, Different alteration of the spectral characteristics of the different announcements to be mixed, Use of signal-manipulating effects such as echo, delay, hall or chorus, Alteration of the speaking style, for example as singing, Intonation, Different audio background, for example music, or Different volumes of the different announcements to be mixed.

To minimize a reduction in acceptance by users of the spoken dialog system, the majority of whom use this application in a main language, it is especially advantageous to play the prompts in other languages, i.e. the secondary languages, at a lower volume, i.e. with a level ratio <1 as compared to the level of the main language or base language.

FIG. 4 shows an example for a time distribution of the overlapping of multiple voice prompts, wherein texts in different languages are mixed by at least one speech output system during the playback time, not sequentially as described in the prior art, but in parallel, are provided if applicable with different signal characteristics, and are output. Shown are speech sequences 601 to 603 in a main language, such as, e.g., German, which are output with time-overlapping speech sequences 611 to 613 in a first secondary language, such as, e.g., English, and speech sequences 621 to 623 in a second secondary language, such as, e.g., Turkish. Furthermore, a music background 630 is provided in the example shown.

Each of the spoken dialog systems 301 to 303 shown in FIGS. 1 to 3 can be used for such an output of superimposed voice prompts. It is also possible to use any desired combination of multiple different output systems for recorded speech and/or TTS systems, which can if applicable provide the individual parallel outputs with different signal characteristics, and the outputs of which are connected in parallel to the same output channel.

In addition to the mixing of speech outputs with notification of the possibility of use in different languages, another embodiment of the invention consists of the use of additional output modes of the terminal device. In order for the spoken dialog system to determine the functionality of the terminal device, the terminal device preferably transmits an identification to the spoken dialog system during connection setup; said identification either directly includes information on the functionality or output modes of the terminal device or identifies the terminal device type. As a function of the terminal device type, the spoken dialog system can read the available output modes from an appropriate database, for example.

In the event that the user's terminal device has the appropriate capabilities, information on the possibility of use in different languages is output on the terminal device's display when calling a multilingual spoken dialog service; this information can be supplemented directly at the terminal device by additional brief audio and/or speech outputs at suitable volume during communication with a spoken dialog service. In this regard, a short audio output can be provided as a notification tone, for example. In an advantageous embodiment, the desired language can also be set by manual operating actions after the output of the options for different languages at the terminal device.

In principle, it is possible to communicate simultaneously through multiple voice channels with telecommunications terminal devices equipped with suitable decoding methods, since data can be virtually transmitted through multiple channels if adequate bandwidth is present. In this way, spoken additional information and/or speech outputs for additional different languages can advantageously be transmitted through different channels. In this case, a mixing of the outputs as described above can also take place as late as at the terminal device. The possibility for the application server to control the channels is unaffected thereby.

Furthermore, by means of at least one operating action by the user, for example by means of a side-mounted control wheel, it is advantageously possible to switch from a default processing, for example mixing, of the individual outputs or channels to a separate simultaneous and/or selective individual transmission or individual output and/or mixing of specific channels.

A separate simultaneous output can be accomplished using a stereo or multi-channel output functionality, for example, through the corresponding right and left channels or other acoustically localizable channels, corresponding to selective single output through the corresponding right or left channels or other acoustically localizable channels. If the number of available output channels suitable for localization by the ear is larger than the number of languages to be offered, mixing of the speech outputs in different languages is not absolutely necessary if the information can be transmitted to the terminal device in parallel. Otherwise, the signal conversions 421 . . . 42N are used to assign the individual acoustic data of the voice prompts 410 . . . 41N to, e.g., different spatial positions by known methods.

An inventively equipped multilingual language portal, which is designed to identify the caller's language and uses German, for example, as the main language, permits channeling of non-German-speaking callers in an especially advantageous manner, since direct forwarding to an agent who speaks the native language is possible, for example. Greater customer satisfaction, an improved image, and a reduction in the hang-up rate can be achieved in this way.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

LIST OF REFERENCE CHARACTERS

100 Mobile or stationary telecommunications terminal device, for example landline telephone, cell phone, PDA, MDA, or the like
200 Data network, voice network and/or transmission network for inputs and outputs
300 Dialog system
301-303 Spoken dialog system
401 Mixing system
402 TTS mixing system
310 Information output, for example for recorded speech, speech synthesis, display output, audio signals, or device vibration
320 Output planning
330 Input recognition
340 Analysis/interpretation module for inputs
350 Interaction and/or application management
410 Digitized prompt in the main or base language
411-41N Digitized prompt in the secondary or foreign language(s) 1 to N
421-42N Signal conversion 1 to N
430 Mixer
440 Mixed prompt in different languages
500 Memory with stored spoken dialog application
510 Stored speech outputs, for example in the form of recorded language and/or text
601-603 Speech sequences in the main or base language 611-613 Speech sequences in the secondary or foreign language 1
621-623 Speech sequences in the secondary or foreign language 2
630 Music background

What is claimed is:

1. A method for providing multilingual speech output in an automated spoken dialog system, the method comprising the steps of:
generating, by a telecommunications apparatus, a multilingual speech output that includes a first speech sequence in a first language that overlaps in time with at least one second speech sequence in at least one second language different from the first language;
communicating, by the telecommunications apparatus, the multilingual speech output to a user of a telecommunications terminal device; and
receiving, at the telecommunications apparatus, a response from the user corresponding to a selection of one of the first language and the at least one second language different from the first language,
wherein the telecommunications apparatus is one of a spoken dialog system and the telecommunications terminal device.

2. The method according to claim 1, wherein the multilingual speech output sequence is generated by mixing the first speech sequence and the at least one second speech sequence.

3. The method according to claim 2, Wherein the first speech sequence and the at least one second speech sequence differ from one another in at least one signal characteristic, wherein the at least one signal characteristic includes at least one of volume, announcing voice, speaking rate, speech style, intonation, sound effect, spatial perception and frequency spectrum.

4. The method according to claim 3, further comprising the step of adjusting at least one signal characteristic of the first speech sequence and the at least one second speech sequence prior to mixing.

5. The method according claim 2, wherein the telecommunications apparatus is the spoken dialog system.

6. The method according to claim 5, wherein the spoken dialog system has at least one first operating mode and at least one second operating mode, the method further comprising the steps of:
transmitting an identification from the telecommunications terminal device to the spoken dialog system, and
automatically selecting one of the first operating mode and the second operating mode as a function of the transmitted identification.

7. The method according to claim 6, wherein in the first operating mode the first speech sequence and the at least one second speech sequence are mixed into a speech output sequence in the spoken dialog system and are transmitted to a connected telecommunications terminal device, and wherein in the second operating mode the first speech sequence and the at least one second speech sequence are transmitted in parallel to a connected telecommunications terminal device.

8. The method according to claim 2, wherein the telecommunications apparatus is the telecommunications terminal device.

9. The method according to claim 1, further comprising:
communicating, over a predetermined output channel of the telecommunications apparatus, at least one transmitted speech sequence based on whether the received response from the user corresponds to a selection of the first language or the at least one second language different from the first language.

10. A spoken dialog system, having at least one tangible non-transient computer-readable memory with computer-executable instructions stored thereon that, when executed, provide a multilingual speech output to a user of a telecommunications device, the spoken dialog system comprising:
a control unit configured to control the spoken dialog system,
an input unit configured to register and analyze user inputs,
an output unit configured to output, using at least a portion of the computer-executable instructions, the multilingual speech output, wherein the multilingual speech output includes a first speech sequence in a first language that overlaps in time with at least one second speech sequence in at least one second language different from the first language, and
a multilingual speech generation unit configured to generate the multilingual speech output;
wherein the input unit is further configured to determine whether a user input corresponding to a response to the multilingual speech output corresponds to a selection of the first language or the at least one second language different from the first language.

11. The spoken dialog system according to claim 10, wherein the multilingual speech generation unit comprises a mixing system configured to mix the first speech sequence and the at least one second speech sequence.

12. The spoken dialog system according to claim 11, wherein the mixing system is further configured to vary at least one signal property of the first speech sequence and the second speech sequence.

13. The spoken dialog system according to claim 11, wherein the mixing system includes a text-to-speech system.

14. The spoken dialog system according to claim 10, wherein the multilingual speech generation unit includes parallel outputs configured to transmit the first speech sequence and the at least one second speech sequence to a connected telecommunications terminal device.

15. The spoken dialog system according to claim 10, wherein the spoken dialog system has a first operating mode in which the first speech sequence and the at least one second speech sequence are mixed into a speech output sequence by a mixing system and are transmitted to a connected telecommunications terminal device, and wherein the spoken dialog system has a second operating mode in which the first speech sequence and the at least one second speech sequence are transmitted in parallel to the connected telecommunications terminal device.

16. The spoken dialog system according to claim 15, further comprising a memory with an allocation table stored therein, wherein the allocation table includes data usable to allocate terminal device types to the first operating mode or the second operating mode, wherein the spoken dialog system is further configured to automatically activate the first operating mode or the second operating mode as a function of an identification received from the connected telecommunications terminal device.

17. The spoken dialog system according to claim 10, wherein the spoken dialog system is connectable to at least one telecommunications terminal device through a telecommunications network.

18. A telecommunications terminal device, comprising:
a user interface configured to select, through user inputs, at least one language corresponding to at least one of a first language and at least one second language different from the first language in response to a multilingual speech output, wherein the multilingual speech output includes a first speech sequence in the first language that overlaps in time with at least one second speech sequence in the at least one second language, and an output device configured to output at least one other speech sequence through a predetermined output channel of the telecommunications terminal device, wherein the at least one other speech sequence corresponds to the at least one language selected by the user.

19. The telecommunications terminal device according to claim 18, further comprising a mixing system configured to mix the first speech sequence and the at least one second speech sequence to generate the multilingual speech output.

* * * * *